United States Patent [19]

Tanner

[11] 4,019,035
[45] Apr. 19, 1977

[54] METHOD AND APPARATUS FOR CONTROLLING THE INITIATION OF MULTIPLE START THREADING CUTS

[75] Inventor: Randall Curtis Tanner, Cincinnati, Ohio

[73] Assignee: Cincinnati Milacron, Inc., Cincinnati, Ohio

[22] Filed: Jan. 23, 1976

[21] Appl. No.: 651,938

[52] U.S. Cl. .............................. 235/151.11; 82/5; 318/573; 318/39
[51] Int. Cl.² .......................................... B23G 3/04
[58] Field of Search ................. 82/5; 235/151.11 X

[56] References Cited
UNITED STATES PATENTS 3,854,353  12/1974  Cutler ........................ 235/151.11 X Primary Examiner—Eugene G. Butz
Attorney, Agent, or Firm—C. Richard Eby

[57] ABSTRACT

A method and apparatus are disclosed for controlling the initiation of cutting motions for cutting multiple start threads on a rotating workpiece held in a spindle of a numerically controlled machine. The numerical control contains an interpolator circuit responsive to a spindle feedback circuit connected to the spindle for generating a marker pulse and a predetermined number of spindle pulses for every revolution of the spindle. The apparatus provides input signals representing a particular threading start number relative to the total number of threading starts. Next, a control signal is generated which represents a number of spindle pulses as a function of the ratio of the particular threading start number to the total number of threading starts. Upon detecting an occurrence of a marker pulse which would normally initiate a threading motion, the apparatus is operative to inhibit a number of spindle pulses corresponding to the control signal. Subsequent spindle pulses are passed to the interpolator circuit thereby initiating the threading motion.

10 Claims, 2 Drawing Figures

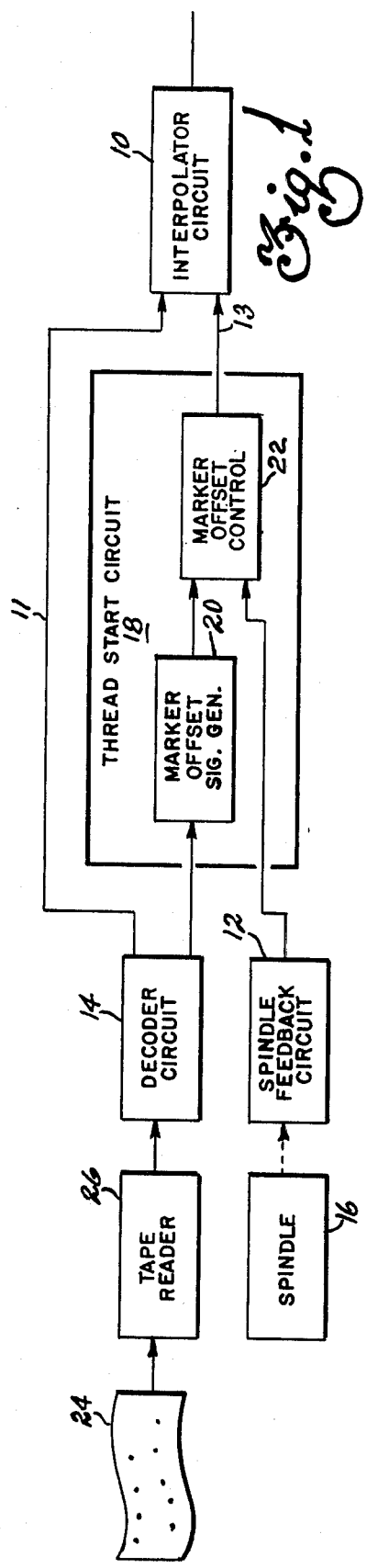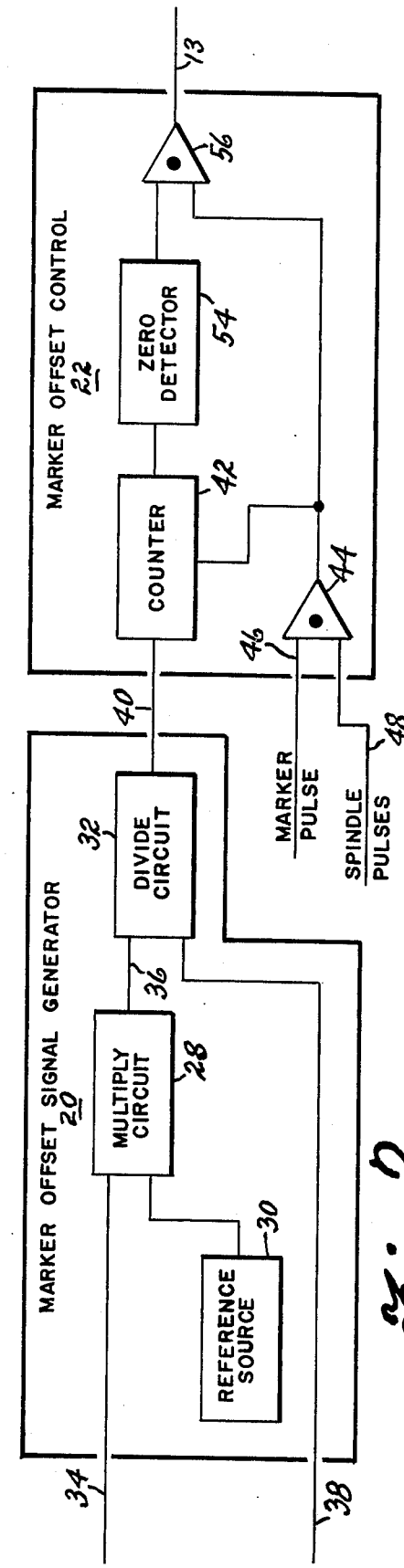

METHOD AND APPARATUS FOR CONTROLLING THE INITIATION OF MULTIPLE START THREADING CUTS

BACKGROUND OF THE INVENTION

The invention relates generally to the area of numerical control apparatus. Specifically the invention provides a method and apparatus for initiating the generation of multiple start threads on a workpiece.

Many numerical controls have the capability of controlling a turning machine to cause it to cut threads on a workpiece held in a rotating spindle. A program generates input signals representing the desired thread lead, spindle speed and thread length. The thread is cut by moving a single point tool in an iterative manner over the workpiece, and the depth of cut is increased with each iteration of movement until the desired thread is cut.

The numerical control contains a spindle feedback circuit connected to the spindle for generating a marker or index pulse every spindle revolution in addition to a predetermined number of spindle pulses every revolution. An interpolator circuit is responsive to the spindle pulses and the input signal defining the thread lead in inches per revolution for generating command pulses to a servomechanism controlling the cutting tool. In a normal threading situation, before the threading span is executed, the cutting tool is moved to a position close to the workpiece. After the programmed threading information is read by the control, the marker pulse is used to initiate the threading pass, i.e. the marker pulse is used to gate spindle pulses to the interpolator to initiate the generation of command pulses. After the first threading pass, the cutting tool returns to the initial starting position. However, the cutting tool is moved to a position closer to the center line of the workpiece thereby increasing the depth of cut. Again, the marker pulse is used to gate spindle pulses to the interpolator. Therefore, the marker pulse guarantees that with every thread pass, the cutting tool makes contact with the workpiece at the same relative rotational position.

With the system described above, it may desired to cut multiple start threads. Since the relative rotational position of the workpiece is fixed with regard to the marker pulse, the starting point of the cutting tool has to be changed. For example, if a two-start thread is required, the second thread would be cut by shifting the tool relative to the workpiece an amount equal to one-half the programmed lead. This is a function of the programmer and requires him to keep track of as many start points as there are threading starts. Further, in the case of longer leads, the start point must be shifted a substantial distance. Aside from the inherent loss of efficiency in such an operation, there are many situations where the configuration of the machine or the workpiece prevents such a large shifting in the start point.

The disclosed invention overcomes the above disadvantages; and in its preferred embodiment, permits a programmer to program a large range of multiple start threads via a simple code which does not cause a change in the start point of the tool for different threading starts.

SUMMARY OF THE INVENTION

According to one embodiment of the invention, a method and apparatus are provided for controlling the initiation of threading spans for multiple start threads for use in a numerical control. The numerical control is comprised in part of an interpolator circuit which is responsive to a spindle feedback circuit connected to a machine spindle. The spindle feedback circuit produces a marker pulse and a predetermined number of spindle pulses during each revolution of the spindle. The numerical control contains an improvement comprised of means for providing input signals representing a particular threading start number relative to the total number of threading starts. Further means are responsive to the input signals and a reference signal representing the predetermined number of spindle pulses per revolution for producing a control signal. The control signal represents a second number of spindle pulses which are related to the predetermined number of spindle pulses in the same manner that the particular threading start number is related to the total number of threading starts. Finally, means are provided which have inputs responsive to the marker and spindle pulses and the control signal and further has an output connected to the interpolator circuit. This means is operative to detect the occurrence of a marker pulse normally initiating a threading motion and includes apparatus for inhibiting the operation of the interpolator circuit while detecting a number of subsequent spindle pulses corresponding to the control signal. Thereafter, the spindle pulses are allowed to pass to the interpolator circuit thereby initiating a threading motion corresponding to the particular threading start number.

BRIEF DESCRIPTION OF THE DRAWINGS

FIG. 1 is a detailed block diagram illustrating the invention.

FIG. 2 is detailed block diagram illustrating the basic elements of the invention shown in FIG. 1.

DESCRIPTION OF THE PREFERRED EMBODIMENT

FIG. 1 is a general block diagram illustrating the invention. The Figure illustrates a number of elements which are shown in the prior art threading controls. An interpolator circuit 10 is responsive to a spindle feedback circuit 12 and input signals generated by a decoder circuit 14 representing the thread lead and thread length. The spindle feedback circuit typically has a transducer element in mechanical communication with a spindle 16. The spindle is provided a rotational motion by a spindle motor (not shown) and includes a chucking mechanism for holding a workpiece therein (not shown). The spindle feedback circuit responds to the output of the transducer and generates two signals during each revolution of the spindle. The first signal is a marker or index pulse at least one of which is generated with each revolution. The second signal is comprised of a number of spindle pulses. The number of spindle pulses required is a function of the resolution and magnitude of the programmed lead. The frequency of the spindle pulses is a function of the rotational velocity of the spindle.

The interpolator circuit 10 responds to a programmed input signal on line 11 representing the desired thread lead. The spindle pulses on line 13 provide command pulses which are operative to initiate motion of a thread cutting tool on a machine tool slide (not shown) relative to the workpiece in the spindle. Each command pulse generated by the interpolator circuit represents a predetermined increment of motion of the cutting tool. A number of spindle pulses must be supplied to the interpolator circuit such that, during each revolution of the spindle, a number of command pulses are generated by the circuit to linearly displace the cutting tool by an amount equal to the programmed lead. The circuit as described above is common to almost all numerical controls which are associated with turning machines and capable of a thread cutting operation.

As discussed earlier each threading motion is initiated by the occurrence of a marker or index pulse from the spindle feedback circuit 12. This guarantees that with each cutting iteration of the thread, the linear displacement of the cutting tool is coordinated with the rotational position of the workpiece. With the prior art devices, in order to cut multiple start threads, the starting point for each threading start had to be adjusted in accordance with the total number of starts and the magnitude of the thread lead. This, of course, complicated the programmers function; and in situations with long thread leads, the off-set of the start point sometimes interfered with the machine or the workpiece thereby making the cutting of multiple start threads impossible.

In order to solve this problem, a thread start circuit 18, comprised of a marker offset generator 20 and a marker offset control 22 is used. This circuitry is used in conjunction with an otherwise standard threading control. To implement the disclosed system, input signals are required which define a particular threading start number relative to the total number of threading starts. This can be accomplished in a number of ways, however, in the preferred embodiment, this input information is programmed on a preforated tape in association with a unique alphabetic address. The preferred embodiment requires that the programmer include in a standard punched tape program 24, an alphabetic address an a two digit numeric code. The first numeric digit represents the total number of thread starts and the second numeric digit represents the particular thread start number to be machined with the current threading information. This punched tape is read by a tape reader 26 which produces output signals to a decoder circuit 14. The decoder circuit 14 provides input signals representing the numeric digits contained on the punched tape to a marker off-set generator 20. The marker off-set generator 20 produces a control signal which represents a second predetermined nunber of spindle pulses. This second predetermined number of spindle pulses bears the same relationship to the total number of spindle pulses produced during each revolution that the particular threading start number bears to the total number of threading starts. For example, if a two start thread were desired, and it was further desired to operate on the first thread start the programmer would code an alphabetic address and the numeric digits 21. Further, the relationship of the particular start number to the total number of threading starts would be 1:2. If the total number of spindle pulses produced during each revolution were 1000 then the marker off-set signal generator would produce a control signal representing 500 spindle pulses, i.e. 1:2.

A marker offset control 22 is responsive to the control signal generated by the marker off-set signal generator 20 and the marker and spindle pulses generated by the spindle feedback circuit 12. In response to a marker pulse which would normally initiate a thread cutting motion, the marker offset control 22 is operative to inhibit a number of spindle pulses to the interpolator circuit equal to the number of spindle pulses corresponding to the control signal. In other words, in the example above, the marker offset control would respond to the marker pulse normally initiating a threading span by inhibiting the next 500 spindle pulses. Thereafter, the spindle pulses would be transferred directly to the interpolator circuit which would generate command pulses in the normal manner thereby causing the cutting tool to move relative to the workpiece.

From the above description, to accomodate a plurality of threading starts, instead of adjusting the thread start point, the disclosed apparatus is operative to delay the time of the thread start for a portion of a revolution of the spindle corresponding to the particular thread start. This technique overcomes the disadvantages of the earlier process for initiating the generation of multiple start threads.

As will be appreciated by those who are skilled in the art, there are several alpha-numeric codes that may be used to define the particular thread start to be executed. For example, an alphabetic address may be programmed followed by a numeric code representing the ratio of the particular start number of the total number of threading starts. This ratio may then be implemented by the marker offset signal generator to generate the control signal. Because of the limitations of resolution of the programmed code and the characteristics of the apparatus to carry out the calculation in generating the control signal, applicants prefer the coding of the two digits to define the particular thread start versus the programming of a ratio.

FIG. 2 is a detailed block diagram illustrating the basic circuit elements necessary to carry out the disclosed invention. The marker offset signal generator 20 is comprised of a multiplier circuit 28, a reference source 30 and a divider circuit 32. A first input signal representing the particular thread start number is received on an input 34 connected to an output of the decoder circuit 14. A reference source 30 is operative to store a reference signal representing a first predetermined number of spindle pulses generated by the spindle feedback circuit during each revolution of the spindle. The multiplier circuit 28 is operative to multiply the particular threading start number times the reference signal to produce a product signal on an output 36. The divider circuit 32 is responsive to the product signal on the line 36 and is operative to divide the product signal by the second input signal on the line 38 representing the total number of threading starts. The divider circuit produces the control signal on an output line 40. A counter circuit 42 in the marker off-set control 22 is operative to load the control signal therein. A gating circuit 44 is responsive to the marker pulses on line 46 and the spindle pulses on line 48 which are generated by the spindle feedback circuits 12.

The gate 44 produces an output signal on line 52 in response to the occurrence of a marker pulse and the spindle pulses. The counter circuit 42 is responsive to the output signal from the gate 44 to count down the number contained therein. Therefore, after the occurrence of a marker pulse normally initiating a threading motion, with each subsequent spindle pulse, the counter 42 is decremented one count. After the occurrence of a number of spindle pulses corresponding to the second predetermined number of spindle pulses defined by the control signal, the counter reaches a zero state. This zero is detected by a zero detector 54 which produces an output to a gating circuit 56. The gating circuit 56 has a second input responsive to the output signal of the gating circuit 44. Therefore, after the counter has counted to zero, all further spindle pulses passing through the gate 44 also pass through the gate 56 to the interpolator circuit 10. The interpolator circuit produces command pulses in the normal manner thereby causing the cutting tool to move with respect to the workpiece and generate a thread corresponding to the particular threading start number programmed.

FIG. 2 illustrates a hard wired circuit embodiment of the claimed invention. However, when using a computer numerical control, a number of the functions executed by the elements of FIG. 2 may be executed by a program compatible with the computer numerical control. Further, the design of such a program may be readily accomplished by one who is skilled in the numerical control art.

While the invention has been illustrated in some detail according to the preferred embodiments shown in the accompanying drawings, and while the preferred illustrated embodiments have been described in some detail, there is no intention to thus limit the invention to such detail. On the contrary, it is intended to cover all modifications alterations, and equivalents falling within the spirit and scope of the appended claims.

What is claimed is:

1. An apparatus for controlling the initiation of threading spans for multiple start threads for use in a numerical control comprised in part of an interpolator circuit responsive to a spindle feedback circuit connected to a machine spindle, said spindle feedback circuit producing a marker pulse and a first predetermined number of spindle pulses during each revolution of the spindle, wherein the improvement comprises:
   a. means for providing input signals representing a particular thread start number relative to the total number of threading starts;
   b. means responsive to the input signals and a reference signal representing the first predetermined number of spindle pulses for producing a control signal representing a second number of spindle pulses as a function of the ratio of the particular thread start number to the total number of threading starts; and
   c. means having inputs responsive to the marker and spindle pulses and the control signal and an output connected to the interpolator circuit for inhibiting the transfer of spindle pulses to the interpolator circuit as a function of the control signal.

2. The apparatus of claim 1, wherein the providing means further comprises:
   a. means for producing a first input signal representing a particular threading start number;
   b. means for producing a second input signal representing the total number of threading starts.

3. The apparatus of claim 2, wherein the means for producing a control signal further comprises:
   a. means for producing a reference signal having a magnitude as a function of the first predetermined number of spindle pulses;
   b. means for multiplying the reference signal times the first input signal to produce a product signal; and
   c. means for dividing the product signal by the second input signal to produce the control signal representing the second predetermined number of spindle pulses.

4. The apparatus of claim 3, wherein the inhibiting means further comprises:
   a. means for detecting a first marker pulse normally initiating a threading span and producing a delay signal;
   b. means responsive to the control signal and the delay signal for producing a start signal in response to the occurrence of the second number of spindle pulses after the first marker pulse; and
   c. gating means responsive to the start signal and the spindle pulses for passing the spindle pulses to the interpolator circuit in response to the start signal.

5. A method for controlling the initiation of multiple start thread cutting motions of a cutting tool under the control of a numerical control comprised in part of an interpolator circuit responsive to a lead number and a spindle feedback circuit connected to a machine spindle for producing a marker pulse during each revolution for normally initiating a thread cutting motion and a predetermined number of spindle pulses during each revolution of the spindle, wherein the improvement comprises the steps of:
   a. providing an input signal representing a particular threading start number relative to the total number of threading starts;
   b. generating in response to the input signal and the predetermined number of spindle pulses a control signal representing a delay in initiating a thead cutting motion corresponding to the particular thread start number;
   c. inhibiting in response to the control signal the transfer of spindle pulses to the interpolator circuit as a function of the control signal.

6. The method of claim 5, wherein the improvement further includes the step of iterating steps (a) through (c) for each threading start.

7. The method of claim 5, wherein the step of providing an input signal further comprises the steps of:
   a. providing a first input signal representing the particular threading start number; and
   b. providing a second input signal representing the total number of threading starts.

8. The method of claim 7, wherein the step of generating a control signal further comprises the steps of:
   a. generating a reference signal representing the predetermined number of spindle pulses generated during each revolution of the spindle; and
   b. multiplying the reference signal times the ratio of the first input signal to the second input signal to produce a control signal representing a second predetermined number of spindle pulses defining the delay time.

9. The method of claim 8, wherein the step of multiplying the reference signal further comprises the steps of:
   a. multiplying the reference signal times the first input signal to produce a product signal; and
   b. dividing the product signal by the second input signal to produce the control signal.

10. The method of claim 9, wherein the step of inhibiting the transfer of spindle pulses further comprises the steps of:
 a. detecting a marker pulse normally operative to initiate a thread cutting motion;
 b. inhibiting the transfer of spindle pulses to the interpolator circuit after the occurrence of the first marker pulse; and
 c. detecting after the occurrence of the first marker pulse a number of spindle pulses corresponding to the second number of spindle pulses defined by the control signal; and
 d. applying subsequent spindle pulses to the interpolator circuit in response to the detection of the second predetermined number of spindle pulses.

* * * * *